: 2,873,295

PROCESS FOR THE PURIFICATION OF 2-ETHYL-CIS-CROTONYLUREA

Albert P. Centolella, Zeeland, Mich., assignor to Miles Laboratories, Inc., Elkhart, Ind., a corporation of Indiana No Drawing. Application March 31, 1958
Serial No. 724,808

7 Claims. (Cl. 260—553)

This invention relates to a new chemical process. Particularly the invention relates to a process for the purification of 2-ethyl-cis-crotonylurea. More particularly the invention relates to a process for the removal of cadmium from 2-ethyl-cis-crotonylurea which has been prepared by the dehydrohalogenation of carbromal using cadmium oxide as a catalyst.

Recently it has been found that by proper control of reaction conditions carbromal may be dehydrohalogenated to give high yields of the cis isomer of 2-ethylcrotonylurea using cadmium oxide as a catalyst. This new process is described and claimed in pending application Serial No. 699,474, filed November 29, 1957, for Otis E. Fancher and assigned to the instant assignee. The process of this invention is closely related to the process described in Serial No. 699,474 and relates to a method of product purification.

Briefly stated the instant invention comprises the steps of adding a suitable base to the reaction mixture obtained when carbromal has been dehydrohalogenated with cadmium oxide to form cadmium hydroxybromide, filtration of the cadmium hydroxybromide thus formed, cooling the filtrate to crystallize out the product, slurrying the product with acetic acid solution to remove residual cadmium and filtering and drying a purified final product.

The advantages of the process are obvious to those skilled in the art since it is essential that the product be substantially free from cadmium. Prior art processes require several recrystallization steps in order to remove residual cadmium with a resulting loss of product and correspondingly reduced yields. With the instant process cadmium levels below about 5 parts per million may be attained without recrystallization.

With respect to the base, sodium hydroxide is preferred and is contemplated in the preferred embodiment. It will be appreciated, however, that any source of hydroxyl ions may be used so long as the cation in the molecule does not interfere with the process and is higher in the electromotive series than is cadmium. For example, potassium hydroxide, lithium hydroxide, calcium hydroxide, barium hydroxide, strontium hydroxide, etc. are operable.

The base is added to the reaction mixture after the dehydrohalogenation reaction is completed in the form of a water solution, preferably in an amount equal to the molar amount of the cadmium oxide used. An operable range of base is between 0.5 and 1.5 moles of base per mole of cadmium oxide.

The acetic acid solution used to slurry the crude product is preferably about a 1.0% solution; however, a solution of from about 0.5% to 10.0% may be used. The slurry of the crude product in the acetic acid solution is thoroughly mixed and maintained in a state of agitation until the product is thoroughly wetted, usually from 30 to 180 minutes. The purified product is then filtered, washed and dried.

As is pointed out below, various agents have been tried in an effort to remove residual cadmium ions from the product but without the desired degree of success. Ammonium carbonate, sodium bicarbonate, sodium carbonate and phosphoric acid were tried, none of them giving the desired yield of product sufficiently low in residual cadmium ion content.

To more specifically describe the instant process, the following detailed example is given.

A one liter flask equipped with a reflux condenser was charged with 71 g. of carbromal, 19.5 g. of cadmium oxide and 750 cc. of isopropanol. The mixture was refluxed for four hours. After this reflux period a solution of 7.0 g. of sodium hydroxide in 20 cc. of water was added over a period of three minutes. At the end of this addition 10 g. of a filter aid comprising a modified cellulose and commercially available under the trade name "Solka-Floc" and 2 g. of an activated charcoal were added. The total mixture, after stirring for 5 minutes, was filtered, the filtration step taking approximately 3 minutes.

The filter cake was washed with hot isopropanol and the washing liquor added to the filtrate. The combined liquors were then cooled and a crude product separated as crystals. These were filtered, washed with 100 cc. of isopropanol, 100 cc. of water, and 50 cc. of isopropanol and then dried. Thirty grams of the dried product was slurried in 500 cc. of water containing 7 cc. of glacial acetic acid for 3 hours. It was then filtered, washed and dried. There was obtained 29 gm. (62.6% yield) of a product having a melting point of 190.5°–192.0° C. and having a cadmium content of 4 p. p. m. The filter cake from the refluxing step assayed 37 grams at 31.8% cadmium or 68.5% of the total cadmium. The mother liquor from the final product filtration assayed .65% cadmium or 4.85 grams. Therefore, the total accountable cadmium was 97%.

Following the procedure described above and varying the product work-up in accordance with the data set out in tabular form below several experiments were run proving the inventive concept. In these experiments aquimolar amounts of carbromal and cadmium oxide were refluxed for four hours in 750 cc. of isopropanol. Filter aid and activated carbon were added to the refluxed mixture and it was filtered while hot, the filter cake was washed with hot isopropanol and the filtrate cooled to room temperature to crystallize the crude product. The crude product was then slurried where indicated, with acetic acid, or, in the lack of acetic acid treatment, the product was recrystallized. Data are set out in the table below.

Table 1

| Ex. No. | Added After Reflux | Crude Yield (percent) | Cadmium on Crude (p. p. m.) | HAC Treated | Pure Yield (percent) | Cadmium on Pure (p. p. m.) |
|---|---|---|---|---|---|---|
| 1 | none | 76.0 | 1,850 | no | 60.1 | 350 |
| 2 [1] | none | 73.5 | 1,600 | yes | 58.3 | 132 |
| 3 | NaHCO$_3$ | 70.3 | 1,920 | yes | 69.0 | 14 |
| 4 [1] | (NH$_4$)$_2$CO$_3$ | 59.5 | 4,400 | yes | 45.4 | 280 |
| 5 | Na$_2$CO$_3$ | 61.5 | 992 | yes | 60.0 | 7 |
| 6 [2] | H$_3$PO$_4$ | | | | | |
| 7 [2] | NaOH (1 eq.) | 58.4 | 160 | yes | | |
| 8 | NaOH (½ eq.) | 68.0 | 66 | yes | 67.0 | .4 |

[1] Recrystallized after HAC slurry.
[2] Not filterable.

An examination of the data appearing in the table above clearly points out the advantages of the inventive process. Experiment 1 is illustrative of the prior art process and the recrystallized product contained residual cadmium to the extent of 350 p. p. m. This experiment also shows that recrystallization does not produce a product of the desired cadmium level. Experiment 2 shows that although the acetic acid treatment does improve the residual cadmium level, the final product still contains an objectionable amount. Experiments 3–5 show that neither NaHCO$_3$, (NH$_4$)$_2$CO$_3$ nor Na$_2$CO$_3$ when combined with the acetic acid treat give cadmium levels sufficiently low. In the case of (NH$_4$)$_2$CO$_3$ and NA$_2$CO$_3$ (Experiments 4 and 5) the yields obtained were also greatly reduced. Experiment 6, using H$_3$PO$_4$, gave a crude product which was not filterable. Experiment 7 shows that one equivalent of base gives a crude product with a greatly reduced cadmium level. In Experiment 8, which illustrates the preferred embodiment of the invention, a high yield of final product was obtained with only 0.4 p. p. m. of residual cadmium.

To reiterate briefly, this invention relates to a process for the purification of 2-ethyl-cis-crotonylurea which has been prepared by the dehydrohalogenation of carbromal using cadmium oxide as a catalyst. It involves the steps of treating the hot refluxed mixture with a base, filtering the mixture to remove cadmium hydroxybromide, cooling the filtrate to precipitate the crude product, filtration of the crude product, slurrying the filtered crude product with an acetic acid solution and filtering the slurry to recover the desired product substantially freed from residual cadmium compounds. The preferred bases are the alkali or alkaline earth metal hydroxides with sodium hydroxide being especially preferred. The base is used in an amount which is equal to from 0.5 to 1.5 moles of base per mole of cadmium oxide used with equimolar amounts being especially preferred. The acetic acid solution used is preferably a 0.1 to 10% solution with a 1.0% solution especially preferred.

What is claimed is:

1. A process for the purification of 2-ethyl-cis-crotonylurea which has been prepared by the dehydrohalogenation of carbromal with cadmium oxide which comprises contacting the hot dehydrohalogenation reaction mixture with a base, cooling the reaction mixture to precipitate 2-ethyl-cis-crotonylurea, slurrying the precipitate with a solution of acetic acid and filtering the slurry to obtain the desired final product substantially free of residual cadmium ions.

2. A process for the purification of 2-ethyl-cis-crotonylurea which comprises contacting the hot reaction mixture subsequent to dehydrohalogenation with from 0.5 to 1.5 moles of a base per mole of cadmium oxide used, cooling the reaction mixture to precipitate 2-ethyl-cis-crotonylurea, slurrying the precipitate with an acetic acid solution of a strength of from 0.1 to 10%, and filtering the slurry to obtain the desired final product substantially free of residual cadmium ions.

3. A process according to claim 2 wherein said base is selected from the class consisting of alkali and alkaline earth metal hydroxides.

4. A process according to claim 2 wherein said base is sodium hydroxide.

5. A process for the purification of 2-ethyl-cis-crotonylurea which comprises contacting the hot reaction mixture subsequent to the dehydrohalogenation reaction with an amount of a base equimolar in amount to the cadmium oxide used, cooling the reaction mixture to precipitate 2-ethyl-cis-crotonylurea, slurrying said precipitate with a 1% solution of acetic acid, continuously mixing said slurry until said precipitate is thoroughly wetted with said solution, and filtering said slurry to obtain the desired final product substantially free of residual cadmium ions.

6. A process according to claim 5 wherein said base is selected from the class consisting of alkali and alkaline earth metal hydroxides.

7. A process according to claim 5 wherein said base is sodium hydroxide.

No references cited.